(12) United States Patent
Holland (10) Patent No.: US 6,351,587 B1
(45) Date of Patent: Feb. 26, 2002

(54) MULTI-FIBER DIGITAL DELAY LINE

(75) Inventor: William Robert Holland, Warrington, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/439,886

(22) Filed: Nov. 12, 1999

(51) Int. Cl.$^7$ ................................................. G02B 6/42
(52) U.S. Cl. .............................. 385/48; 385/24; 385/27
(58) Field of Search ............................. 385/24, 27, 48

(56) References Cited

U.S. PATENT DOCUMENTS

| | | | |
|---|---|---|---|
| 5,109,449 A | * | 4/1992 | Newberg et al. |
| 5,259,051 A | | 11/1993 | Burack et al. ................. 385/76 |
| 5,367,586 A | * | 11/1994 | Glance et al. |
| 5,703,708 A | | 12/1997 | Das et al. .................... 359/140 |
| 5,793,907 A | * | 8/1998 | Jalali et al. |

OTHER PUBLICATIONS

Kenneth P. Jackson et al., "Optical Fiber Delay–Line Signal Processing", IEEE Transactions on Microwave Theory and Techniques, Bol. MTT–33, No. 3, Mar. 1985, pp. 193–210.

* cited by examiner

Primary Examiner—Hung N. Ngo
(74) Attorney, Agent, or Firm—Matthew J. Hodulik; Thomas J. Bean

(57) ABSTRACT

A multi-fiber optical delay line incorporates a plurality of optical fibers nestedly positioned and affixed to a planar substrate. The fibers include input portions that are linearly and proximately positioned on the substrate, and of equivalent length. The fibers also include output portions that are linearly and proximately positioned on the substrate, and of equivalent length. The input and output portions of each fiber are interconnected by a u-shaped connecting portion, and each connecting portion is positioned to have a unique and predetermined length. The predetermined lengths are selected such that differences in length between a shortest fiber and another fiber in the plurality of fibers are equivalent to a fiber length that would be traversed by the input signal during a time period required for the transmission of a predetermined number of bits in the digital signal. The input portions of the fibers are coupled to an optical splitter which provides one copy of an input signal substantially simultaneously to each of the input portions. In a preferred embodiment of the invention, a planar heater and overcoating are used to control the thermal profile across the plurality of fibers.

18 Claims, 4 Drawing Sheets

MULTI-FIBER DIGITAL DELAY LINE

CROSS-REFERENCE TO RELATED APPLICATION

Related subject matter is disclosed in the co-pending, commonly assigned, U.S. patent application of Holland, entitled "Optical Fiber-Based Matched Filter", Ser. No. 09/438,604, filed on even date herewith.

FIELD OF THE INVENTION

This invention relates to optical fiber-based digital delay lines. More specifically, it relates to a multi-fiber digital delay line incorporating nested optical fibers affixed to a substrate in a single physical plane.

BACKGROUND OF THE INVENTION

Current broadband telecommunications networks are being configured to carry increasing volumes of voice, data and multimedia information. To meet these increasing volume demands, such networks are being implemented using optical communications systems technology. Prominent in present high-volume optical communications systems is the use of wave division multiplexed (WDM) or dense wave division multiplexed (DWDM) optical communications schemes that are capable of placing many optical channels centered at different wavelengths on a single fiber. WDM and DWDM networks require sophisticated optical switching capabilities in order to selectively route these many channels among a number of traffic-carrying fibers. In order to appropriately buffer and sequence individual channels to be routed, for example, such switches commonly employ optical delay lines.

Optical delay lines may be formed using a variety of optical technologies (see, e.g., Kenneth P. Jackson et al., "Optical Fiber Delay-Line Signal Processing," IEEE Transactions On Microwave Theory And Techniques, Vol. MTT-33, No. 3, March 1985, pp 193, 194). Optical fiber delay lines have proven to be attractive due to their relatively low loss and low dispersion characteristics. Typical optical fiber configurations include recirculating delay lines, multi-tap delay lines and multi-fiber delay lines. A recirculating delay line incorporates a fiber which partially closes upon itself (for example, by means of an optical coupler) so that signals introduced at one end of the delay line recirculate around the loop to be output with each transit cycle. Non-recirculating optical fiber delay lines such as multi-tap and multi-fiber delay lines produce only a single output signal at each output port in response to each input signal.

The multi-tap structure consists of a fiber with taps distributed along its length, each tap being capable of providing a signal output. The output signals from each tap may be collected and output by an optical combiner. Relative delays among the output signals are controlled by the relative placement of taps along the fiber.

In a typical multi-fiber optical delay line, an optical signal is split and provided as input to two or more optical fibers of varying length (see, e.g., U.S. Pat. No. 5,703,708, issuing to Das et al. on Dec. 30, 1997). The optical signals on each fiber's output are collected and output by an optical combiner. Where an optical signal is provided simultaneously at the inputs of two fibers of unequal length, the optical signal in the shorter fiber appears at the combiner at a point earlier in time than the optical signal in the longer fiber. Accordingly, delay may be controlled among the multiple fibers by adjusting the relative differences in length among the fibers.

Longer fibers can be packaged adjacent to shorter fibers by winding at least of segment of the added differential length of the longer fiber onto a spool. Although the spool helps to lessen the space required, it introduces several difficulties. Variations in the physical length and tension of the optical fiber that result as it is wound onto the spool can cause variations in the effective optical length of the fiber. In addition, optical length may vary with movement of the fiber on the spool.

Such variations may be adjusted, for example, by incorporating a heater in the center of the spool to establish a stable thermal profile for the fiber on the spool. However, variations in the geometry of the spool and in the positioning of the fiber on the spool can make it difficult to establish stability in the thermal profile.

Accordingly, it would be desirable to have a multi-fiber optical delay line that is easily connected to associated components, conveniently and compactly packaged, thermally stable and capable of being assembled and operable for high-speed, multi-fiber applications.

SUMMARY OF THE INVENTION

A multi-fiber optical delay line incorporates a plurality of optical fibers nestedly positioned so that the individual ones of the plurality of optical fibers are collectively positioned in a single plane. Input ends for each of the plurality of optical fibers are connected to an optical splitter, which thereby provides a copy of an input signal to each of the plurality of optical fibers substantially simultaneously. Each of the plurality of optical fibers has a unique, predetermined length, causing each copy of the input signal that travels over an associated one of the plurality of fibers to arrive at an output end of the associated fiber at the end of a unique interval in time. The nestedly planar structure and geometry of the delay line allows the optical length of each of the plurality of optical fibers to be precisely controlled.

In a first embodiment of the present invention, each of the plurality of optical fibers includes an input segment and an output segment joined by a u-shaped connecting segment. The input segments are substantially parallel, equal in length and proximately positioned so that input ends of the input segments all lie substantially near a straight line that is perpendicular to the input segments. Similarly, the output segments are substantially parallel, equal in length and proximately positioned so that output ends of the output segments all lie substantially near a straight line substantially perpendicular to the output segments. Each of the u-shaped connecting segments of the plurality of optical fibers has a unique, predetermined length. To maintain a planar positioning, each of the plurality of optical fibers is affixed to a planar surface of a substrate.

In a second embodiment of the present invention, the output ends of the plurality of optical fibers are each further coupled to one of a plurality of input ports in an optical combiner, such that the optical combiner superimposes received signal copies from the plurality of optical fibers to produce a single optical signal output.

In a preferred embodiment of the invention, a planar heater is attached to a second planar surface of the substrate so that a temperature profile may be established and stabilized in the plurality of optical fibers.

BRIEF DESCRIPTION OF THE DRAWING

A more complete understanding of the invention may be obtained by reading the following description of specific illustrative embodiments of the invention in conjunction with the appended drawing in which.

Figure 3:
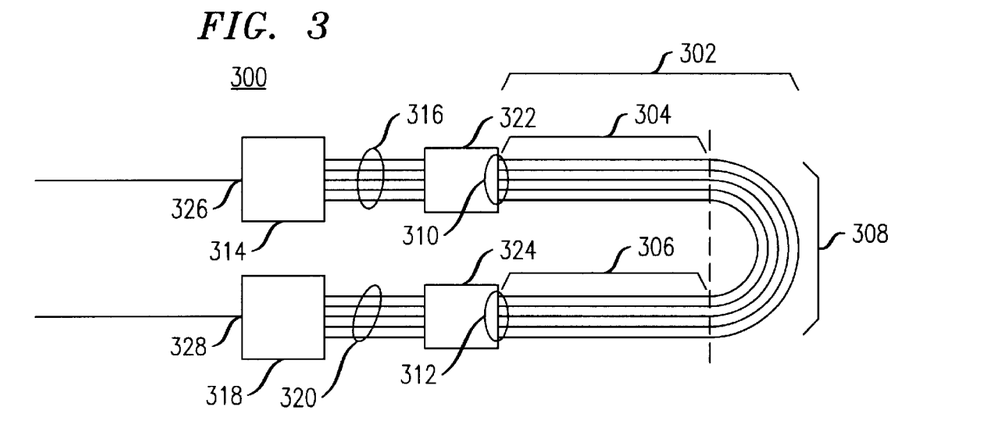
FIG. 3 shows a schematic diagram of an embodiment of the present invention.

For consistency and ease of understanding, those elements of each figure that are similar or equivalent share identification numbers that are identical in the two least significant digit positions (for example, optical splitter 314 of FIG. 3 and optical splitter 414 of FIG. 4).

DETAILED DESCRIPTION

In order to better understand the principles of the present invention, several key aspects of the prior art of first reviewed.

Figure 1:
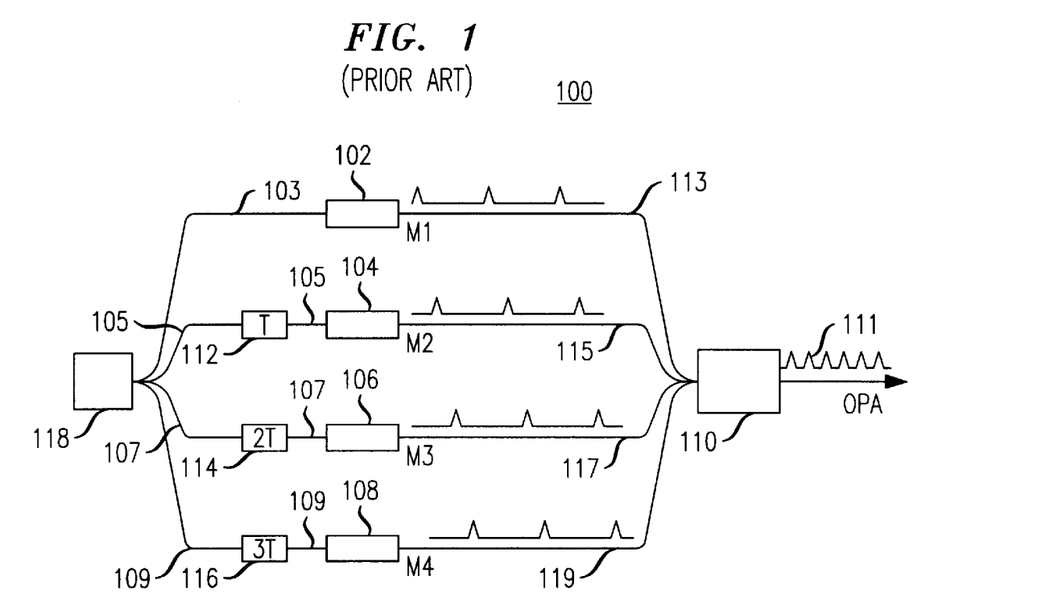
FIG. 1 shows the structure of a prior art optical multiplexer incorporating a multi-fiber optical delay line.

FIG. 1 shows the structure of a prior art optical multiplexer incorporating a multi-fiber optical delay line 100 (see, e.g, U.S. Pat. No. 5,703,708, issuing to Das et al. on Dec. 30, 1997). An optical signal is provided to an optical splitter 118, which produces copies of the signal on four separate fiber signal paths 103, 105, 107 and 109, which are associated with modulators 102, 104, 106 and 108, respectively. Modulated signals are output by the modulators 102, 104, 106 and 108 over signal paths 113, 115, 117 and 109, respectively, and are coupled to inputs of optical combiner 110. Optical combiner 110 superimposes signals provided over the paths 113, 115, 117 and 119 to produce a combined optical signal 111.

To provide for the time-division multiplexing of optical signals modulated by the modulators 102, 104, 106 and 108, optical delay lines 112, 114 and 116 are placed in the fiber signal paths associated with modulators 104, 106, and 108, respectively. Delay lines 112, 114 and 116 produce signal delays T, 2T and 3T, respectively, where the delay T corresponds to a desired time period. Signal delays T, 2T and 3T are produced by selecting optical delay lines 112, 114 and 116 with predetermined lengths in the ratio of 1:2:3, respectively. As a result, signals arriving simultaneously on the signal paths associated with modulators 104, 106 and 108 begin to appear at the output 110 one, two and three time periods, respectively, after the appearance at the output 110 of the signal on the signal path associated with the modulator 102. The signals on the signal paths associated with the modulators 102, 104, 106 and 108 are accordingly time-division multiplexed onto the single path output 110.

Figure 2:
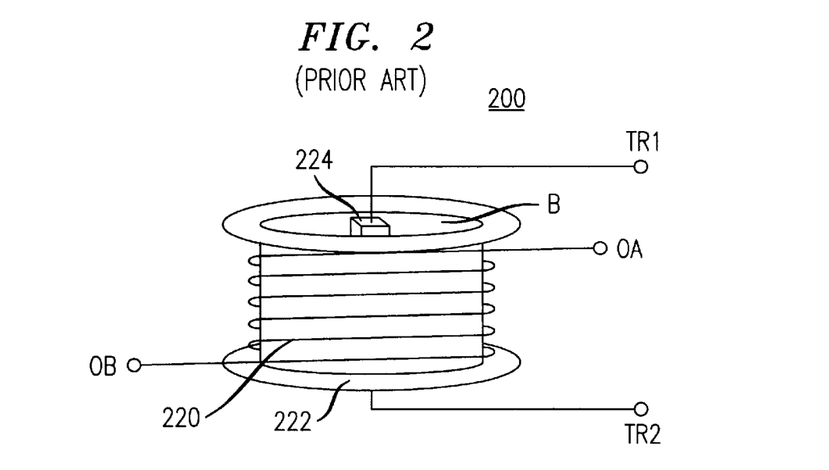
FIG. 2 illustrates a spool for holding a differential fiber length in the prior art multi-fiber optical delay line of FIG. 1.

As depicted in FIG. 2, delay lines 112, 114 and 116 are each produced by winding an optical fiber 220 of appropriate length onto a cylindrical spool 222. Variations in the physical length and tension of the optical fiber wound onto the spool 222 cause variations in the effective optical length of the fiber 220. The effective optical length, for example, determines the time required for an optical signal of a given frequency to travel through the fiber 220. A heating element 224 is positioned on the central axis of the cylindrical spool 222 to enable the effective optical length of the optical fiber 220 to be thermally tuned and stabilized.

The delay line 100 of FIG. 1 may be ineffective to control, for example, optical lengths in high-speed digital applications where the differences in optical length between delay lines 112, 114 and 116 of FIG. 1 are quite small. In addition, this configuration will be ineffective for thermally tuning segments of optical fibers associated with the delay lines 112, 114 and 116 that are not wound onto the spool 222 of FIG. 2 (for example, a fiber segment that comes off of the spool 222 in order to provide optical connection to the modulator 102 of FIG. 1). Finally, it may be difficult or awkward to position a plurality of spools 222 in a reasonable physical enclosure for multi-fiber optical delay lines constructed with many individual optical fibers.

Substantial improvements over the prior art are realized by the present invention, which incorporates a multi-fiber delay line arranged with a novel geometry. In an embodiment of the delay line illustrated in FIG. 3, optical fibers 302 of delay line 300 are nestedly positioned in a single plane. Each fiber includes an input segment 304 and an output segment 306 joined by a unshaped connecting segment 308. The input segments 304 are substantially parallel, equal in length and proximately positioned so that input ends 310 of the input segments all lie substantially near a straight line that is perpendicular to the input segments. Similarly, the output segments 306 are substantially parallel, equal in length and proximately positioned so that output ends 312 of the output segments all lie substantially near a straight line substantially to the output segments 306. In the embodiment of FIG. 3, each of the u-shaped connecting segments 308 of the plurality of optical fibers 302 has a unique, predetermined length.

The input ends 310 of the plurality of optical fibers are further individually coupled to output fibers 316 of an optical splitter 314 via a mass fiber interconnection 322. Optical splitters are well-known in the art and are available commercially from a number of suppliers including, for example, Photonic Integration Research, Inc. and Sumitomo Electric Lightwave Corp. Mass fiber interconnection methods are well-known in the art. A preferred method for mass fiber interconnection is mass fusion splicing, which may be performed using equipment available from a variety of commercial vendors including Sumitomo Electric Lightwave Corp. and Fujikura Limited.

An optical signal, for example, amplitude modulated as a digital bit stream, is provided at an input 326 of the splitter 314. Via output port fibers 316 that are formed, for example, in equal lengths in a ribbon, the optical splitter 314 provides copies of a single input signal substantially simultaneously to each of the plurality of input segments 304 at the mass fiber interconnection 322. The copies travel through input segments 304, connecting segments 308 and output segments 306 until they reach input port fibers 320 of an optical combiner 318 via mass fiber connection 324. Input port fibers 320 are formed, for example, in equal lengths in a ribbon so that optical signals arriving at output ends 312 of optical fibers 302 may arrive in an equivalent time sequence at optical combiner 318. Optical combiner 318 combines the received signals into a single signal provided at combiner output 328. The output 328 may typically be interconnected with a conventional photodetector to detect the presence of the combined optical signal. Such photodetectors are commercially available, for example, from Lucent Technologies Inc.

Because each of the unshaped connecting segments 308 of the plurality of optical fibers 302 has a unique, predetermined length, optical signal copies introduced into the optical fibers 302 at input ends 310 will each travel along an optical fiber 302 of unique length to arrive at an associated output end 312 of the fiber 302 at a unique time. The relative delay in time $\Delta T_R$ between the arrival of a signal on a shorter fiber of length $L_S$ and the arrival of a signal along a longer fiber $L_L$ can be expressed as:

$$\Delta T_R = n_c*(L_L - L_S)/c \tag{1}$$

where $n_c$ is the refractive index of the core of the fiber and c is the speed of light in a vacuum (see, e.g., Jong-Dug Shin et al., "Fiber-Optic Matched Filters with Metal Films Deposited on Fiber Delay-Line Ends for Optical Packet Address Detection," Photonics Technology Letters, Volume 8, Number 7, July 1996, p. 941). The combined signal produced at combiner output 328 will incorporate the relative delays among the signal copies arriving at output ends 312.

By maintaining the optical fibers 302 in a single geometrical plane with input segments 304 and output segments 306 each including fiber segments of equal length positioned proximately, individual fiber lengths for the optical fibers 302 may be more easily controlled. Control of fiber length is extremely important in high-speed, bit-selective applications of the delay line in which differential lengths $L_L-L_S$ may be extremely small (for example, as small as as five millimeters in 40 gigabit per second digital applications).

Figure 4A:
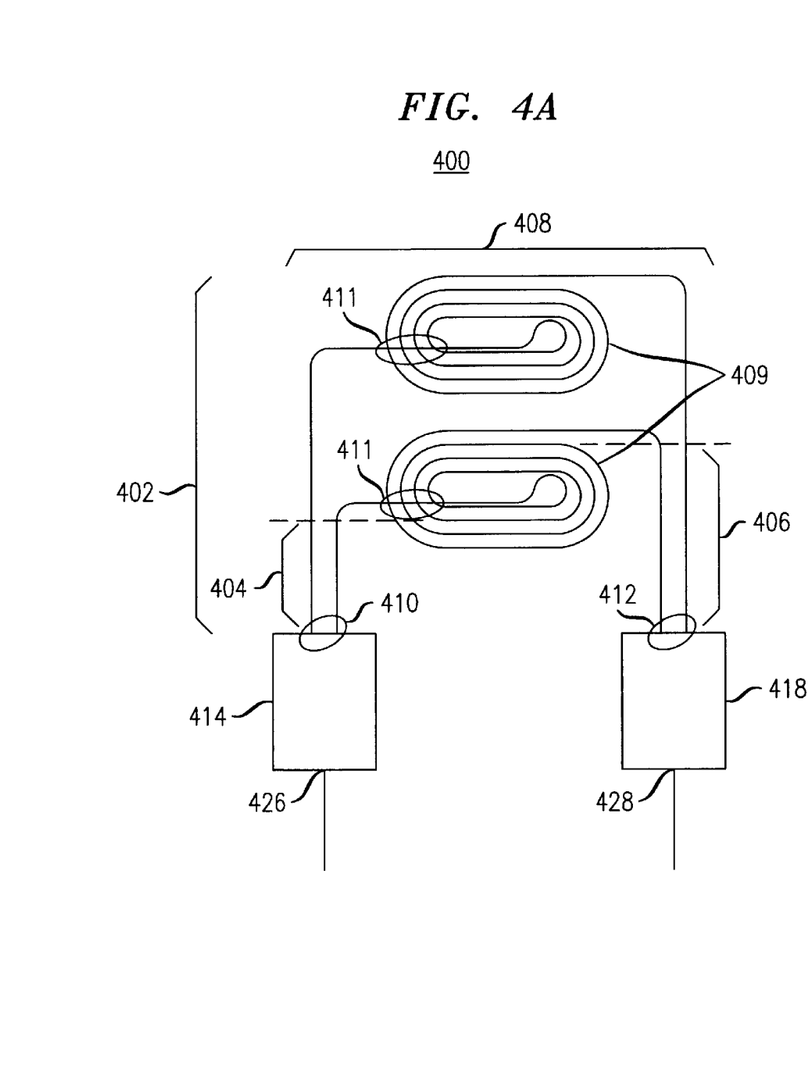
FIGS. 4A and 4B show schematic diagrams for second and third embodiments of the present invention.

FIG. 4A illustrates a second embodiment of the present invention. As in the embodiment of FIG. 3, optical fibers 402 of delay line 400 are nestedly positioned, substantially in a single plane. Input segments 404 and output segments 406 each contain fiber lengths that are substantially parallel, equal in length and proximately positioned.

In contrast to the connecting segments 308 of FIG. 3, the fiber lengths in the connecting segments 408 of FIG. 4 further incorporate coil segments 409. Coil segments 409 lie substantially in the single plane defined by the optical fibers 402, and provide a compact means for increasing the lengths of the optical fibers 402 over the lengths of the optical fibers 302 of FIG. 3. This embodiment may be important in optical buffering applications where an absolute time of delay $\Delta T_A$ is of importance, as measured from the time that copies of the signal are provided to input ends 410 of FIG. 4 until the time that a copy first appears at the output end 412 of the short fiber length $L_S$:

$$\Delta T_A = n_c * L_S/c \tag{2}$$

where the fiber length Ls incorporates lengths associated with an input segment 404, an output segment 406 and a connecting segment 408 (including a coiled segment 409).

In FIG. 4A, a small crossing segment 411 of u-shaped connecting segments 408 of optical fibers 402 rests in a plane parallel to and slightly above the plane defined by connecting segments 408, input segments 404 and output segments 406. Alternatively, the crossing segment 411 of FIG. 4A may be eliminated entirely as shown in delay line 401 of FIG. 4B. Delay line 401 eliminates crossing segment 411 of FIG. 4A by starting coiling a coil segment 409 with a u-shaped portion 413 so that a first portion 415 interconnecting to an input segment 404 and a second portion 417 interconnecting to an output segment 406 are both coiled from the center to the periphery of the coil 409. The embodiment of FIG. 4B is preferred over that of FIG. 4A as it enables all of coil segment 409 to be positioned in a single plane.

Figure 4B:
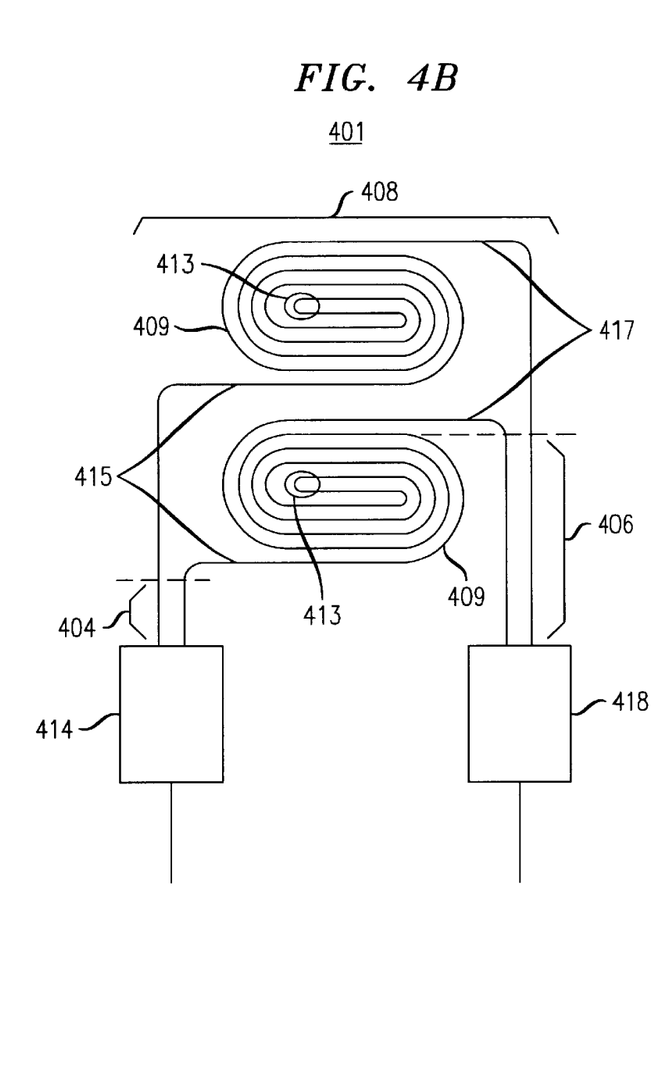
Figure 5:
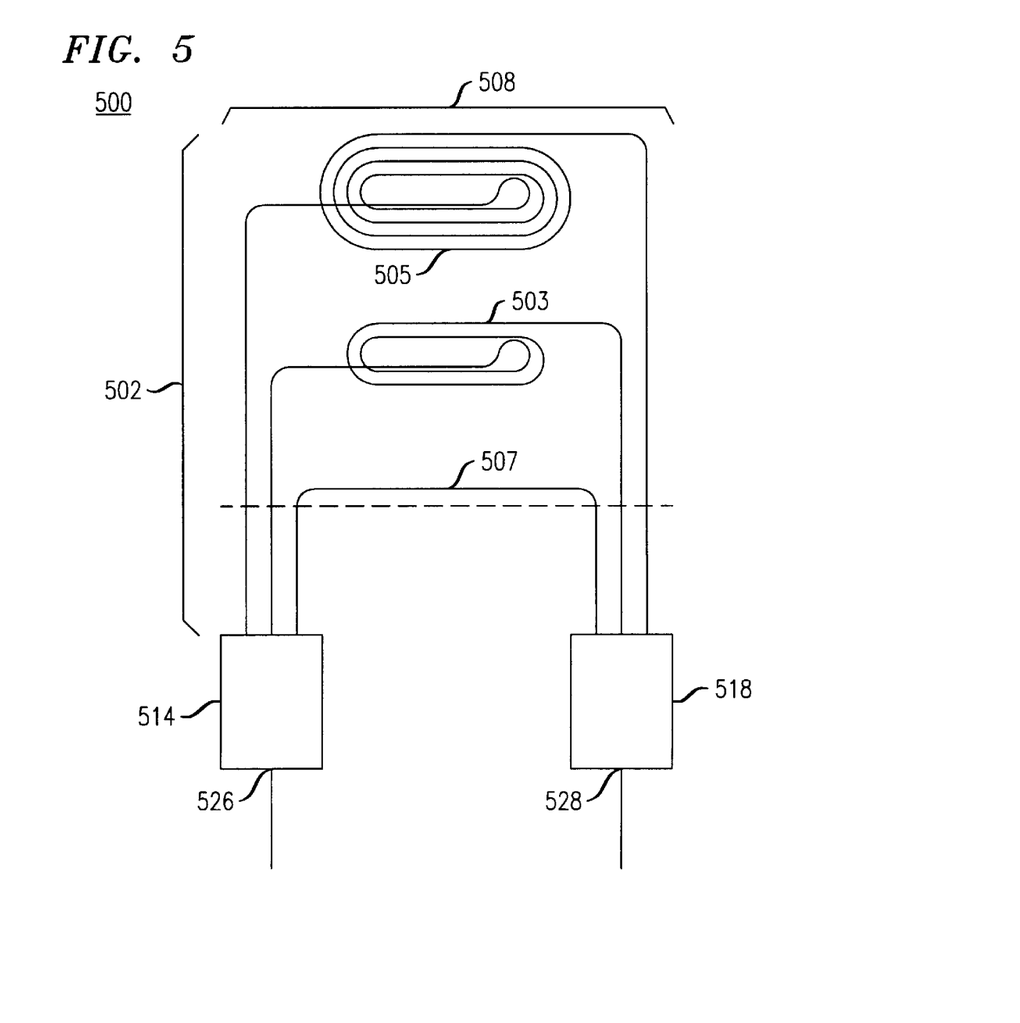
FIG. 5 shows a schematic diagram for a fourth embodiment of the present invention.

The embodiments of FIGS. 4A, 4B may be further modified, for example, as shown in FIG. 5. such that the u-shaped segments 508 of individual fibers in FIG. 5 include coil segments 503 and 505 of varying lengths as well as a u-shaped segment 507 of one fiber that omits the coil segment entirely. This modification to the embodiment of FIG. 4 may be important in applications where the relative time of delay $\Delta T_R$ of equation (1) is required to be large (for example, for multiple bit sequences in high speed applications or for lower speed applications).

Optical fibers 302 of FIG. 3, 402 of FIG. 4 and 502 of FIG. 5 must be positioned in a well-controlled manner in the single plane in order for fiber lengths to be adequately controlled. For example, as shown in FIG. 3, it is desirable that the fibers comprising the input segments 304 and the output segments 306 each be positioned in a straight line with a separation between fibers set at a standard pitch (for example, equal in a distance between 100 and 105 percent of the diameter of the fiber). Also, it is desirable for the fibers to be positioned such that input ends 310 and output ends 312 all lie substantially near a straight line perpendicularly positioned with respect to fibers comprising input segments 304 and output segments 306, respectively. This geometry guarantees that fibers comprising input segments 304 will be of equivalent length, and that that fibers comprising output segments 306 will be of equivalent length. In addition, connecting segments 308 must be positioned to guarantee that associated optical fibers 302 each have a unique, predetermined length.

Figure 6:
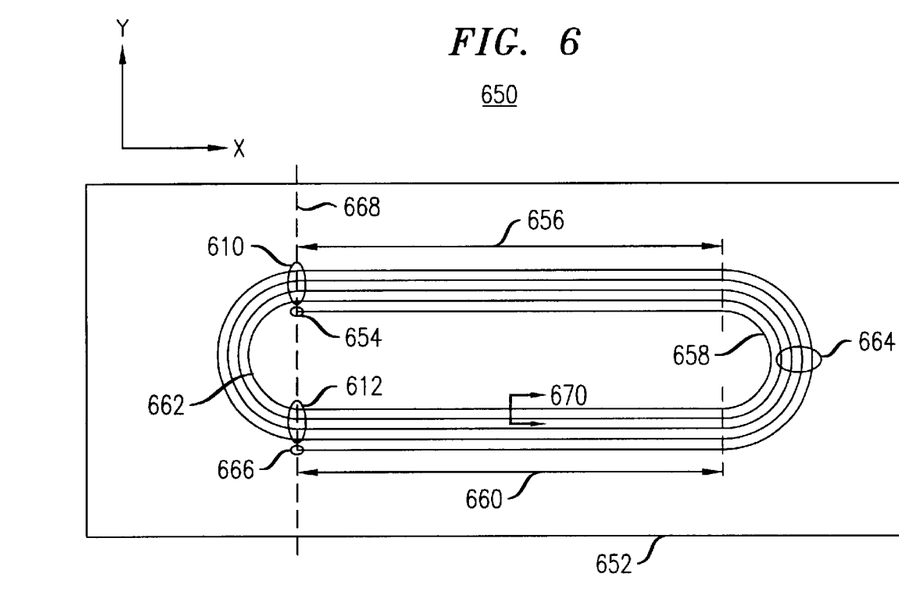
FIG. 6 illustrates an optical fiber and substrate prepared to be incorporated in the embodiment of FIG. 3.

Optical fibers 302 may be positioned in a well-controlled manner using, for example, an automated coordinate-based fiber routing apparatus and method as described in U.S. Pat. No. 5,259,051, issuing to Burack et al. (the "Burack patent") on Nov. 2, 1993, and which is hereby incorporated by reference. Using the apparatus and method of the Burack patent, a manipulator is controlled to move in an X-Y plane and around a vertical axis in order to position an optical fiber on an adhesive-coated substrate. In accordance with the optical delay line of FIG.3, FIG. 6 illustrates an optical fiber 650 routed according to this method. The fiber 650 is positioned on a planar surface of a substrate 652, for example, as follows. Starting end 654 is pressed against the substrate 652, and a first length of fiber is laid against the substrate in an X direction for a distance 656. A semi-circular length 658 is next laid against the substrate in a length equal to the length desired for the shortest fiber in the connecting segments 308 of FIG. 3. A fiber length 660 is then laid against the substrate 652 in an opposite X direction for a distance 660, and a semi-circular length 662 is laid against the substrate 652 to end a short distance from the starting end 654. Another fiber length is laid a distance 656 in the X direction next to the first length laid in the X direction. This pattern repeats until a desired number of additional loops 664 are laid in a layered or nested fashion around the first loop defined by starting end 654, a length 656, semi-circular length 658, a length 660 and semicircular loop 662. After the desired loops are laid against the substrate, the fiber is cut at finishing end 666. Finally, the fiber and substrate are severed at splitting line 668, with the segment left of the splitting line 668 being trimmed away such that the first loop and additional loops 664 become open loops beginning at input ends 610 and terminating at output ends 612. These ends are then fastened to the mass fiber interconnections 322 and 324 of FIG. 3, respectively.

Figure 7:
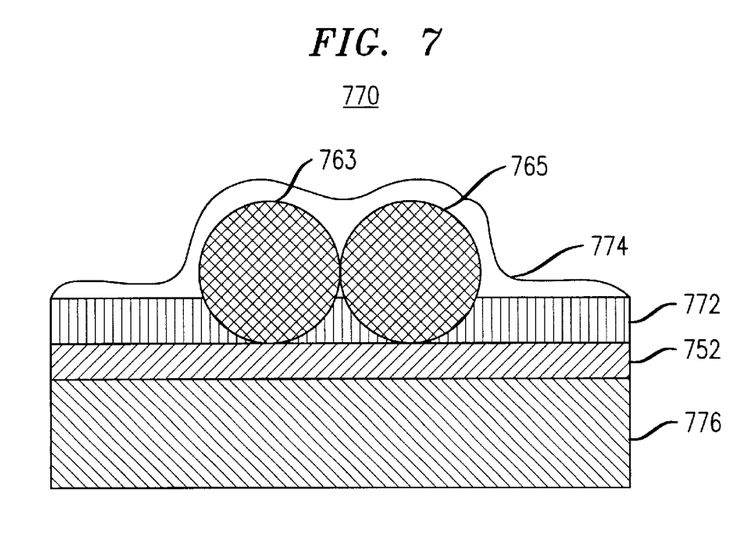
FIG. 7 provides a cross-sectional view of the embodiment of FIG. 6.

FIG. 7 shows a cross-section 770 through section 670 of FIG. 6. Optical fibers 763 and 765 are pressed into an adhesive coating 772 in order to come into fixed contact with planar substrate 752. An overcoating 774 is then applied over the adhesive coating 772 and the fibers 763 and 765, and a planar heater 776 is attached to a lower surface of the planar substrate 752. Such heaters are well-known in the art and are commercially available, for example, from Minco Products, Inc. Overcoating 774 serves as an encapsulating filler material to fill the air gaps surrounding the fibers and ensure even transfer of heat between the planar heater 776 and the fibers 763 and 765, and may be a commercially-available thermally-conducting silicone material available, for example, from Dow Corning Corporation. The overcoating 774 and heater 776 thereby establish a stable thermal profile for the optical fibers 763 and 765 that helps to stabilize the effective optical length of the fibers 763 and 765.

The exemplary embodiments described above are but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, the input segments 304 and output segments 306 of FIG. 3 may be positioned to have other than a parallel relationship to each other (e.g., the input segments 304 may be perpendicular to the output segments 306). In addition, the output fibers 316 of the optical splitter 326 and the input fibers of the optical combiner 320 may be positioned in more than one plane so that the optical fibers 302 may be positioned in more than one plane.

I claim:

1. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein each fiber includes one or more fiber segments, wherein the one or more fiber segments include:

an input segment, wherein the input segment includes the input end, and individual ones of the input segments for the plurality of optical fibers are collectively and co-linearly positioned substantially in the single physical plane so that the input ends of the individual ones of the input segments lie on a line substantially perpendicular to the individual ones of the co-linear input segments;

an output segment, wherein the output segment includes the output end, and individual ones of the output segments for the plurality of optical fibers are collectively and co-linearly positioned substantially in the single physical plane so that the output ends of the individual ones of the output segments lie on a line substantially perpendicular to the individual ones of the co-linear output segments; and a connecting segment, wherein individual ones of the connecting segments for the plurality of optical fibers are collectively and nestedly positioned in the single physical plane, wherein ones of the plurality of input segments have substantially equivalent optical lengths, ones of the plurality of output segments have substantially equivalent optical lengths and each of the plurality of connecting segments has a unique predetermined optical length.

2. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein each fiber includes one or more fiber segments, wherein the one or more fiber segments include:

an input segment, wherein the input segment includes the input end, and individual ones of the input segments for the plurality of optical fibers are collectively and co-linearly positioned substantially in the single physical plane so that the input ends of the individual ones of the input segments lie on a line substantially perpendicular to the individual ones of the co-linear input segments;

an output segment, wherein the output segment includes the output end, and individual ones of the output segments for the plurality of optical fibers are collectively and co-linearly positioned substantially in the single physical plane so that the output ends of the individual ones of the output segments lie on a line substantially perpendicular to the individual ones of the co-linear output segments; and a connecting segment, wherein individual ones of the connecting segments for the plurality of optical fibers are collectively and nestedly positioned in the single physical plane, wherein each of the plurality of input segments has a unique predetermined optical length, each of the plurality of output segments has a unique predetermined optical length and ones of the plurality of connecting segments have substantially equivalent optical lengths.

3. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein each fiber includes one or more fiber segments, wherein the one or more fiber segments include a singular segment, the singular segment being u-shaped and including the input end and the output end, and wherein singular segments for each of the plurality of optical fibers each have a unique predetermined optical length.

4. The delay line of claim 3, wherein input ends for each of the plurality of optical fibers lie substantially on a first line and output ends for each of the plurality of optical fibers lie substantially on a second line.

5. The delay line of claim 4, wherein the first line and the second line extend to form a single line.

6. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein a difference d between the predetermined optical length of a first one of the plurality of optical fibers and the predetermined optical length of a second one of the plurality of optical fibers is equivalent to an optical length that would be traversed by a digital optical input signal during a time period required for the transmission of a predetermined number of bits in the digital optical input signal.

7. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein the nested position of the plurality of optical fibers is maintained in the single plane by bonding said plurality of optical fibers to a first planar surface of a substrate.

8. The delay line of claim 7, wherein the substrate comprises a rigid, dimensionally stable material.

9. The delay line of claim 8, wherein the material is selected from the group consisting of MYLAR, glass epoxy and polyimide.

10. The delay line of claim 7, further comprising a planar heater affixed to a second planar surface of the substrate.

11. The delay line of claim 10, wherein said planar heater is selectively energized to establish a predetermined, stable thermal profile in the plurality of optical fibers such that drift and jitter in the optical fibers are substantially eliminated.

12. The delay line of claim 11, wherein said planar heater is a thin film heater.

13. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, further comprising an optical combiner for combining the input signal copies arriving at the output ends of the plurality of optical fibers to form a single output signal.

14. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein each fiber includes one or more fiber segments, wherein the one or more fiber segments include:

an input segment, wherein the input segment includes the input end, and individual ones of the input segments for the plurality of optical fibers are collectively and co-linearly positioned substantially in the single physical plane so that the input ends of the individual ones of the input segments lie on a line substantially perpendicular to the individual ones of the co-linear input segments;

an output segment, wherein the output segment includes the output end, and individual ones of the output segments for the plurality of optical fibers are collectively and co-linearly positioned substantially in the single physical plane so that the output ends of the individual ones of the output segments lie on a line substantially perpendicular to the individual ones of the co-linear output segments; and a connecting segment, wherein individual ones of the connecting segments for the plurality of optical fibers are collectively and nestedly positioned in the single physical plane, wherein the nested optical fibers are further concentrically wound into a coil, such that the input segments and the output segments of the nested optical fibers proximately project from a circumference of the concentric coil.

15. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein each fiber includes one or more fiber segments, wherein the one or more fiber segments include:

an input segment, wherein the input segment includes the input end, and individual ones of the input segments for the plurality of optical fibers are collectively and co-linearly positioned substantially in the single physical plane so that the input ends of the individual ones of the input segments lie on a line substantially perpendicular to the individual ones of the co-linear input segments;

an output segment, wherein the output segment includes the output end, and individual ones of the output segments for the plurality of optical fibers are collectively and co-linearly positioned substantially in the single physical plane so that the output ends of the individual ones of the output segments lie on a line substantially perpendicular to the individual ones of the co-linear output segments; and a connecting segment, wherein individual ones of the connecting segments for the plurality of optical fibers are collectively and nestedly positioned in the single physical plane, wherein the connecting segment of at least one optical fiber further includes one or more concentric loops, the concentric loops being substantially positioned in the single plane and bonded to the substrate surface.

16. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein the plurality of optical fibers are multimode fibers.

17. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein individual ones of the input segments are spaced at a standard pitch so that a first uniform distance between a central axis of a first input segment and a central axis of an adjacent input segment is between 100 and 105 percent of a diameter of the first fiber.

18. An optical delay line capable of receiving an optical input signal and of outputting a plurality of copies of the input signal that are delayed in time with respect to each other, the delay line comprising:

a plurality of optical fibers each having an input end, and positioned substantially in a single physical plane and in nested relation each to the others such that each of the plurality of optical fibers has a unique predetermined optical length; and an optical splitter arranged to produce a plurality of copies of the input signal and provide one copy of the input signal substantially simultaneously to each one of the plurality of input ends;

whereby each of the plurality of copies traverses a particular one of the plurality of optical fibers over a unique interval in time to arrive at an output end of the particular one of the fibers, the unique time interval being related to the predetermined optical length of the particular one of the fibers, wherein individual ones of the output segments are spaced at a standard pitch so that a first uniform distance between a central axis of a first output segment and a central axis of an adjacent output segment is between 100 and 105 percent of a diameter of the first fiber.

* * * * *